Feb. 7, 1950 F. B. LLEWELLYN 2,496,633

MULTITARGET CATHODE-RAY DEVICE

Filed Dec. 24, 1947

INVENTOR
F. B. LLEWELLYN
BY
ATTORNEY

Patented Feb. 7, 1950

2,496,633

UNITED STATES PATENT OFFICE 2,496,633

MULTITARGET CATHODE-RAY DEVICE

Frederick B. Llewellyn, Summit, N. J., assignor to Bell Telephone Laboratories, Incorporated, New York, N. Y., a corporation of New York Application December 24, 1947, Serial No. 793,733

16 Claims. (Cl. 250—164)

Figure 1:
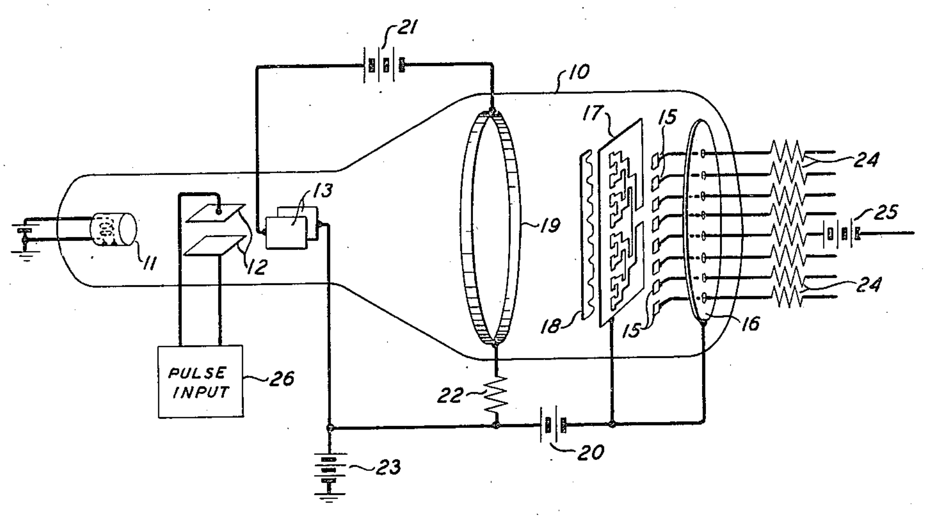

This invention relates to electron discharge devices and more particularly to multitarget cathode ray devices especially suitable for electronic switching and signal translation.

One general object of this invention is to improve electronic switching or translating devices of the electron beam, multitarget type.

More specifically, objects of this invention are to enable the selective connection of one circuit to any one of a number of other circuits in accordance with groups of signal pulses, to realize positive and accurate guidance of the beam in a multitarget cathode ray device, to any one of a number of the targets and to realize selective connection of circuits by such a device in accordance with the polarities of signal pulses in a group of a preassigned number of such pulses.

In one illustrative embodiment of this invention, an electron discharge comprises a plurality of targets, an electron gun for projecting a concentrated electron beam toward the targets and deflection elements for deflecting the beam in two coordinate directions.

In accordance with one feature of this invention, means are provided in association with the beam-deflecting elements for directing the beam selectively to any one of the targets in accordance with groups of signal pulses applied to certain of the deflection elements.

In one specific embodiment of this invention, the beam-deflecting elements comprise two pairs of deflector plates in space quadrature and a beam-guiding plate or mask is provided between the deflecting plates and the targets, the plate or mask having therein a plurality of openings defining tortuous connecting paths all extending from a common point and each terminating opposite a respective one of the targets. The openings are composed of sections extending in two directions of deflection of the beam by the deflector plates. The mask or plate is coupled to one pair of the deflector plates in feedback relation, such that in accordance with the principles disclosed in Patent 2,417,450, granted March 18, 1947, to Raymond W. Sears, the deflecting potential between the deflector plates noted is controlled to hold the beam against edges of the openings when a deflecting potential is applied to the other pair of plates. Upon application of a group of signal pulses to these other plates, the electron beam is directed along one of the tortuous paths to impinge upon the respective target in accordance with the polarities of the pulses in the group. In one embodiment including eight targets, the beam is directed selectively to any one of eight targets in accordance with the polarities of the pulses in a group of three. For example, for a group of pulses having polarities of positive-negative-positive, respectively, the beam will be directed to one target, for a group of pulses having polarities of negative-negative-positive, respectively, the beam will be directed to another target, and so on. The beam may be returned to its initial position, that is at the common point of the several paths, by an additional or return pulse.

Figure 2:
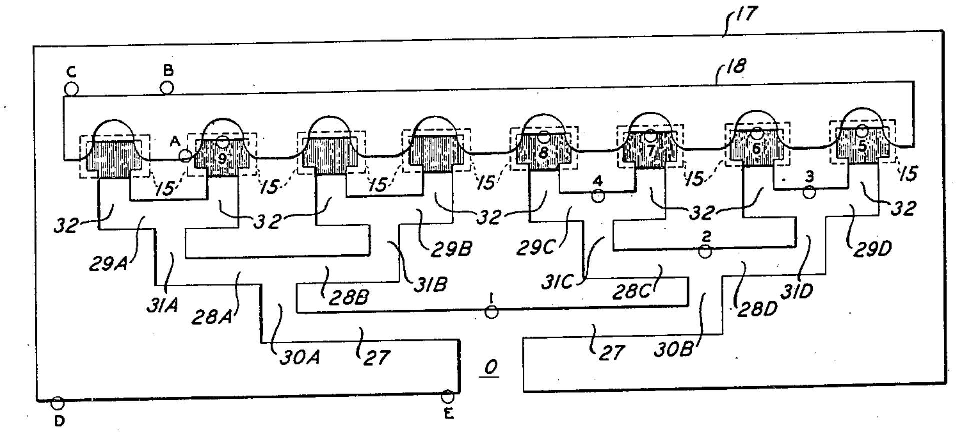

The invention and the above-noted and other features thereof will be understood more clearly and fully from the following detailed description with reference to the accompanying drawing in which:

Fig. 1 is in part a perspective view of a cathode ray device and in part a circuit schematic showing an electronic switch or distributor illustrative of one embodiment of this invention; and Fig. 2 is a face view of the beam guiding plate or mask, the return mask, and the target electrodes included in the device shown in Fig. 1.

Referring now to the drawing, the cathode ray device therein illustrated comprises an evacuated enclosing vessel 10 at one end of which an electron gun for projecting an electron beam longitudinally of the vessel is mounted. The gun may be of known construction and, in order to simplify the drawing, is illustrated in rudimentary form in Fig. 1 as an indirectly heated cathode 11. Opposite the electron gun are two pairs of parallel deflector plates 12 and 13 mounted in space quadrature.

A plurality of target electrodes 15 are mounted at the other end of the vessel 10 in line with one another normal to the deflector plates 12 and a backing electrode or plate 16 is positioned behind these electrodes, i. e. opposite the side thereof remote from the cathode 11. A beam-guiding mask or plate 17, of a construction to be described presently, is interposed between the electron gun and targets. Advantageously the mask of plate 17 is of a material having a secondary electron emission coefficient greater than unity, or the face thereof toward the cathode is coated with an emissive material having such a coefficient.

Opposite the front of the plate 17 and near one edge thereof is an insulating plate or return mask 18. Also opposite the front face of the plate or mask 17 is a ring electrode 19 which functions to collect secondary electrons emanating from the plate or mask 17.

The collector electrode 19 is biased positive with respect to the mask or plate 17 by a source such as a battery 20, and is connected to one of the deflector plates 13 through a source, such as a battery 21, and to the other of these plates through a feedback resistor 22. It is held positive with respect to the electron gun by a source, such as a battery 23. Each of the target electrodes 15 is connected to a respective load circuit, represented by a resistor 24, and is biased positively by a source, such as a battery 25, only one of which is shown. The backing electrode or plate 16 may be connected to the negative side of the source 20, as shown. Groups of signal pulses are impressed between the deflector plates 12 from an input circuit 26.

As shown in Fig. 2, the beam-guiding mask or plate 17 is provided with apertures defining tortuous paths extending from a region O and each terminating opposite a respective one of the target electrodes 15. Specifically, the plate includes an elongated aperture 27 parallel to the direction of deflection of the beam by the deflector plates 12 and having its center at region O, and aperture sections 28A and 28B and 29A to 29D parallel to the aperture 27, the center part of each aperture section 28 and 29 being connected to the adjacent end of the next lower aperture, in Fig. 2, or aperture section, by an aperture section 30A or 30B, or 31A to 31D as shown, the sections 30 and 31 extending parallel to the direction of deflection of the beam by the deflector plates 13. The ends of the sections 29 lead to regions opposite the target electrodes 15 by way of aperture sections 32 extending parallel to the sections 30 and 31 and having enlarged portions at these regions.

The return mask or plate 18 has an undulatory edge the crests of which extend in front of regions between adjacent aperture sections 32. The aperture 29 and sections 28 to 32 inclusive, it will be noted are disposed in symmetrical relation about the vertical center line, in Fig. 2, of the beam-guiding plate or mask 17.

When the electron beam impinges upon the plate or mask 17, secondary electrons flow from the plate or mask to the collector electrode 19 and a voltage is established across the resistor 22, this voltage being of the polarity to oppose that due to the source 21, across the deflector plates 13. The magnitude of the voltage across the resistor 22 will be dependent, of course, upon the secondary electron current which in turn is dependent upon the primary current in the beam and the area of the mask or plate 17 upon which the beam impinges. By correlation of the primary current, the resistor 22 and the source 21, the deflecting force across the deflector plates 13 due to the flow of secondary current through resistor 22 may be made to balance the force due to the source 21 when the beam is incident upon one of the upper horizontal (in Fig. 2) bounding edges of the aperture 27 or aperture sections 28 or 29 or upon the upper horizontal bounding edge of one of the aperture sections 32.

In the operation of the device, the potentials upon the deflector plates 12 and 13 are adjusted so that normally the beam is at position 1 in Fig. 2, that is in grazing incidence with the upper bounding edge of the aperture 27 and at the center thereof. At this position and at any other along this bounding edge the beam is in equilibrium vertically, i. e., the feedback voltage due to secondary electron flow from the mask or plate 17 to the collector electrode 19 opposes the deflecting voltage due to the source 21 so that the net deflecting force, in the vertical direction, upon the beam is zero.

Assume, now, that a voltage pulse is impressed between the deflector plates 12, the pulse being of such magnitude as to move the beam to a region just beyond the right-hand extremity of the upper horizontal edge of the aperture 27 in Fig. 2. As soon as the beam passes beyond this extremity, the secondary current to the collector electrode 19 falls to zero and as a result the heretofore noted balance of deflecting forces across the plates 13 is disturbed. Consequently, the beam moves upwardly. When it reaches position 2, secondary electron current again flows from the plate or mask 17 to the collector electrode 19, a voltage is established across resistor 22, in opposition to that due to the source 21, and equilibrium of the beam again is established. Application of another signal pulse between the deflector plates 12 will move the beam along the upper bounding edge of aperture section 28, to the left or right depending upon the polarity of the pulse. When the beam passes beyond the end of this bounding edge, the balance of vertical deflecting forces is disturbed and the beam moves upwardly through aperture section 31C or 31D to another equilibrium position 3 or 4. In a similar manner, as is apparent, application of a third signal pulse between the deflector plates 12 will cause the beam to move to one of the equilibrium positions 5, 6, 7 or 8, depending upon the polarity of the pulse, and impinge upon the respective target electrode 15.

It will be noted that the beam can be directed from position 1 to impinge upon any one of the target electrodes by application of groups of three pulses of prescribed polarity between the deflector plates 12. For example, if in Fig. 2 deflection of the beam to the right results from a pulse of positive polarity and deflection to the left results from a pulse of negative polarity, the beam will be guided from position 1 to position 5 by a group of three pulses having polarities of positive-positive-positive, respectively; will be guided from position 1 to position 7 by a group of pulses of positive-negative-positive polarity, respectively; and will be guided from position 1 to position 9 by a group of pulses having polarities of negative-negative-positive, respectively. Hence, it will be appreciated that the load circuits 24 may be closed selectively, each in accordance with a particular pulse group applied to the deflector plates 12.

In the construction illustrated in Fig. 2, each aperture section 29 is one-half as long as each aperture section 28 and each of the latter is half as long as the aperture 27. Hence, successive pulses in each group applied to the deflector plates 12 should be of 1:2 amplitude ratio. This ratio may be obtained by suitable construction of the input circuit 26 if initial pulses of the same amplitude are applied to this circuit. It will be understood, of course, that other length relations, greater or less than 2:1, of the successive aperture and aperture sections may be used, the input circuit in each case being designed to produce the requisite ratio of pulse amplitudes in each group of pulses.

After the beam has been deflected to impinge upon a target 15, it is returned to position 1 in readiness for deflection by another pulse group. This is effected by the return mask 18 and the application of a return pulse between the deflector plates 12. The operation will be understood from the following considerations. Assume that the beam has been deflected to position 9 and that a pulse, of either polarity, is applied between the deflector plates 12. If the pulse is of the polarity to effect motion of the beam to the left in Fig. 2 and is of at least a prescribed magnitude pointed out hereinafter, the following sequence of actions occurs: The beam moves from position 9 to a position such as A so that it impinges upon the insulating mask 18. Consequently, the flow of current through resistor 22 is interrupted, the beam is not in equilibrium and, hence, moves upwardly to position B, at the upper edge of the mask 18, so that it impinges upon the plate 17. Current flows through the resistor 22 and balance of the vertical deflecting forces is established. Still under the influence of the pulse aforementioned, the beam moves to position C and then beyond the left-hand end of the mask. When it passes this end it impinges upon the plate 17, the current through resistor 22 increases and the vertical deflecting force is such as to move the beam downwardly to position D at the lower edge of the plate 17. At the position, the beam is in equilibrium. At the cessation of the return pulse, the beam moves to the right along the lower edge of the plate 17, through position E, then into region O and upward to equilibrium position 1.

It is evident that the beam may be returned from any target position to position 1 by a return pulse of either polarity, the only requirement being that the return pulse be of sufficient amplitude to move the beam beyond one or the other end of the mask 18.

Although in the specific embodiment of the invention shown and described, the guiding plate or mask 17 is such as to direct the beam selectively to any one of eight targets in accordance with the polarities of pulses in groups of three pulses, it will be understood that a different number of targets and an appropriately designed plate or mask 17 may be used. For example, sixteen targets may be employed, in which pulse groups of four would be necessary to effect selective direction of the beam to any target and the mask 17 would be such that each aperture section 32 would lead into the central part of an aperture section parallel to the sections 29.

Also, although the aperture sections 28 and 29 and aperture 27 have been shown and described as extending normal to the aperture sections 30, 31 and 32 they may extend at other than right angles thereto in which case the deflector plates 12 would be oriented to deflect the beam in the direction parallel to the sections 28 and 29 and aperture 27. Further, although targets 15 have been shown only opposite the ends of the tortuous beam paths defined by the apertures in the plate 17, additional targets may be provided opposite other portions of the paths, for example opposite such positions as 2, 3 and 4, whereby selective connection to output circuits associated with the targets may be effected upon the basis of the number, as well as the polarities, of pulses in an input pulse group.

It will be understood also that the specific embodiment of the invention shown and described is but illustrative and that various other modifications may be made therein without departing from the scope and spirit of this invention as defined in the appended claims.

What is claimed is:

1. An electron discharge device comprising a plurality of targets, means for projecting an electron beam toward said targets, a beam-guiding member between said means and said targets and having therein apertures defining a plurality of paths each of which extends from opposite a respective one of said targets to a common region, each of said paths including a plurality of sections alternate ones of which extend in two coordinate directions, and means including said guiding member and plural means for deflecting said beam in said two directions, for selectively directing said beam along any one of said paths in accordance with the polarities of signal pulses in pulse groups applied to certain of said deflecting means.

2. An electron discharge device in accordance with claim 1 comprising means including a mask member opposite the face of said guiding member toward said beam-projecting means for effecting return of said beam from any target to said common region in response to application of an additional pulse to said certain deflecting means.

3. An electron discharge device in accordance with claim 1 wherein said beam-guiding member is secondary electron emissive and wherein said selectively directing means includes a collector electrode opposite said guiding member and electrically connected to other of said deflecting means.

4. An electron discharge device comprising a mask member having therein apertures defining a plurality of tortuous paths extending from a common region, each of said paths comprising a plurality of sections alternate ones of which are substantially parallel and adjacent ones of which are at substantially right angles to one another, means opposite one face of said mask member for projecting an electron beam thereto, a plurality of targets opposite the other face of said mask member, each of said targets being opposite the end of a respective one of said paths remote from said common region, and means for selectively directing said beam from said common region along any one of said paths in accordance with the polarities of signal pulses in a pulse group, said directing means including said mask member and including also a first deflection means for deflecting said beam in the direction parallel to one group of said alternate sections, a second deflection means for deflecting said beam in the direction normal to said first direction, means for applying groups of signal pulses to said first deflection means and a feedback coupling between said mask member and said second deflection means.

5. An electron discharge device in accordance with claim 4 wherein said one face of said mask member is secondary electron emissive and wherein said feedback coupling includes a collector electrode opposite said one face of said mask member.

6. An electron discharge device in accordance with claim 4 comprising a second mask member opposite said one face and adjacent the ends of said paths remote from said common region, said second mask member being of insulating material and said first mask member extending beyond said second mask member.

7. An electron discharge device comprising a plurality of targets, means for projecting an electron stream to said targets, a first deflection means effective when energized to deflect said stream in one direction, a second deflection means effective when energized to deflect said stream in a direction at an angle to said first direction, means for impressing groups of a preassigned number of signal pulses upon said second deflection means, and means for selectively directing said beam to any one of said targets in accordance with the polarities of the pulses in a group, said selective directing means comprising means for energizing said first deflection means to effect stepping of said stream in said first direction in response to each pulse in a group impressed upon said second deflection means.

8. An electron discharge device in accordance with claim 7 wherein said energizing means comprises an auxiliary electrode between said targets and said stream projecting means and coupled to said first deflection means for energizing said first deflection means in accordance with the stream current intercepted by said auxiliary electrode.

9. An electron discharge device in accordance with claim 8 comprising means including an insulating mask member between said auxiliary electrode and said stream projecting means for directing said beam to a preassigned position in response to application to said second deflection means of an additional signal pulse following impressing of any one of said groups of pulses.

10. An electron discharge device comprising a plurality of targets, means for projecting an electron beam toward said targets, and means for selectively directing said beam to any one of said targets in accordance with the polarities of pulses in a group of pulses, said beam directing means comprising a plate between said targets and said beam projecting means and having therein a pair of apertures extending from a common region and terminating in a plurality of spaced portions each opposite a respective one of said targets, each of said apertures including sections extending in one direction and pairs of branches extending substantially normal to said first direction, each pair of branches extending in opposite directions from one end of a respective one of said sections, a first deflection means for deflecting said beam in said one direction, a second deflection means for deflecting said beam in said normal direction, means biasing said first deflection means to direct said beam to said region, means coupling said plate to said first deflection means for energizing said first deflection means in accordance with the beam current intercepted by said plate and in the sense to oppose said biasing means and means for applying groups of pulses to said second deflection means.

11. An electron discharge device comprising a plate electrode having therein a plurality of parallel aperture sections arranged in longitudinally spaced groups, the number of sections in each group being double that in the next preceding group, said electrode having also therein a second plurality of parallel aperture sections arranged in rows and extending at an angle to said first sections and each connecting a respective pair of said first sections, each of said first sections extending from one end of a respective one of said second sections to an intermediate region of a corresponding second section in the next succeeding row, a plurality of targets opposite one face of said electrode and each aligned with a respective one of said first aperture sections, means opposite the other face of said electrode for projecting an electron beam to said targets, a first deflection means for deflecting said beam in the direction parallel to said first aperture sections, a second deflection means for deflecting said beam in the direction parallel to said second aperture sections, means for energizing said first deflection means including a feedback coupling between said electrode and said first deflection means, and means for applying groups of signal pulses to said second deflection means.

12. An electron discharge device in accordance with claim 11 wherein said other face of said electrode is secondary electron emissive and wherein said feedback coupling includes a collector electrode opposite said electrode and connected to said first deflection means.

13. An electron discharge device comprising a row of targets, means opposite said targets for projecting an electron beam thereto, an auxiliary electrode intermediate said targets and said means and having therein a plurality of apertures extending normal to said row and each opposite a respective one of said targets, said electrode having also therein a first group of parallel aperture sections each extending between and leading into a respective pair of adjacent apertures, a second group of aperture sections parallel to said first sections and each having its ends leading into a respective pair of said first sections, and an end aperture parallel to said groups of aperture sections and in communication with the aperture sections of said second group, and means including said auxiliary electrode for selectively directing said beam from a region in said end aperture to any one of said plurality of apertures along paths composed of communicating apertures and aperture sections, in accordance with the polarities of signal pulses in a group of pulses, said selective directing means including also a first deflection means for deflecting said beam in the direction parallel to said plurality of apertures, means for energizing said first deflection means to produce a deflecting force tending to deflect said beam in one direction parallel to said plurality of apertures, means coupling said auxiliary electrode to said first deflection means for energizing said first deflection means to produce a deflecting force in opposition to said first deflecting force and a second deflection means for deflecting said beam in either direction parallel to said first group of aperture sections.

14. An electron discharge device in accordance with claim 13 wherein the face of said auxiliary electrode toward said beam-projecting means is secondary electron emissive and wherein said coupling means comprises a collector electrode opposite said face.

15. An electron discharge device in accordance with claim 13 comprising an insulating mask opposite the face of said auxiliary electrode toward said beam-projecting means and having an undulatory edge the crest portions of which extend into the regions between adjacent ones of said plurality of apertures, said auxiliary electrode extending beyond the other edges of said means.

16. An electron discharge device comprising a plate electrode having therein apertures defining a plurality of similar tortuous paths extending from a common region to a plurality of spaced regions, one for each path, each of said paths being composed of sections, one group of alternate sections in each path being parallel and the other alternate sections in each path being parallel and extending at an angle to said one group of sections, each of said group of alternate sections being common to two of said paths and corresponding sections of said paths being parallel, means for projecting an electron beam toward one face of said plate electrode, and means for selectively directing said beam along any one of said paths in accordance with the polarities of signal pulses in a group of pulses, said selective directing means including a first deflection means for deflecting said beam parallel to said other alternate sections, means for impressing groups of signal pulses upon said first deflection means, a second deflection means for deflecting said beam parallel to said group of alternate sections and a feedback coupling between said plate electrode and said second deflection means for applying to said second deflection means a voltage of amplitude determined by the beam current intercepted by said plate electrode.

FREDERICK B. LLEWELLYN.

REFERENCES CITED

The following references are of record in the file of this patent:

UNITED STATES PATENTS

| Number | Name | Date |
|---|---|---|
| 2,223,001 | Farnsworth | Nov. 26, 1940 |
| 2,265,216 | Wolf | Dec. 9, 1941 |
| 2,404,106 | Snyder | July 16, 1946 |
| 2,474,223 | Chevigny | June 28, 1949 |
| 2,474,810 | Ardi et al. | July 5, 1949 |